United States Patent [19]

Bernstein

[11] 4,261,756

[45] Apr. 14, 1981

[54] LEAD ALLOY AND GRANULATE CONCRETE CONTAINING THE SAME

[75] Inventor: Max J. Bernstein, Paris, France

[73] Assignee: Bermat S.A., Grand Duchy, Luxembourg

[21] Appl. No.: 927,533

[22] Filed: Jul. 24, 1978.

Related U.S. Application Data

[63] Continuation of Ser. No. 683,184, May 4, 1976, abandoned.

[30] Foreign Application Priority Data

May 6, 1975 [LU] Luxembourg ............................. 72418
Jun. 17, 1975 [LU] Luxembourg ............................. 72759

[51] Int. Cl.³ ............................................... C04B 7/02
[52] U.S. Cl. ...................................... 106/97; 252/478
[58] Field of Search ........................... 106/97, 98, 104; 75/166 C; 252/478

[56] References Cited

U.S. PATENT DOCUMENTS

| | | | |
|---|---|---|---|
| 1,743,303 | 1/1930 | Andrews | 75/166 C |
| 1,860,095 | 5/1932 | Harris | 75/166 C |
| 2,726,339 | 12/1955 | Borst | 106/97 |
| 3,207,705 | 9/1965 | Hall | 252/478 |
| 3,536,920 | 10/1970 | Sedlak et al. | 252/478 |

*Primary Examiner*—James Poer
*Attorney, Agent, or Firm*—Fishman and Van Kirk

[57] ABSTRACT

Radiation shielding concrete is prepared using a lead alloy which will not oxidize in the presence of water. The alloy is incorporated in the cement used to prepare the concrete in powdered and granular forms. A boron containing material may also be added to the cement.

9 Claims, No Drawings

LEAD ALLOY AND GRANULATE CONCRETE CONTAINING THE SAME

This is a continuation of application Ser. No. 683,184, filed May 4, 1976, now abandoned.

BACKGROUND OF THE INVENTION (1) Field of the Invention

The present invention relates to the containment of radioactive materials and particularly to the production of shielding materials suitable for use in the absorption and deceleration of nuclear radiation. More specifically, this invention is directed to novel lead alloys and lead-loaded cements including such lead alloys. The invention also encompasses the manufacture of lead alloys for use in lead-loaded cement and the production of reinforced and unreinforced lead alloy granulate concrete. Accordingly, the general objects of the present invention are to provide novel and improved methods and materials of such character.

(2) Description of the Prior Art

The progressive substitution of nuclear energy for other energy sources, and particularly for combustion processes employing fossil fuels, requires the implementation of stringent safety measures which insured protection from nuclear radiation. Such protection is required, not only in the vicinity of a nuclear reactor, but also in the course of transportation and use of radioactive materials for medical and research purposes and in the transportation and storage of radioactive wastes. Thus, in order to avoid radioactive contamination, walls and enclosures must be provided which are capable of absorbing nuclear radiation, particularly neutrons and gamma rays, or reducing such radiation to a level where its biological activity does not exceed accepted dosage standards.

The materials and screens used for protection against nuclear radiation must be designed by taking into account those forms or types of radiation which have the maximum penetrative power and range; i.e., gamma rays and neutrons. Effective protection against gamma rays requires high-density materials with a high atomic number. The material most commonly employed for shielding sources of gamma radiation is lead.

With regard to neutrons, effective shielding requires that a distinction in the energy spectrum be made between fast neutrons; i.e., those with an energy in excess of approximately 100 ev; and slow or thermal neutrons. Fast neutrons have to undergo thermalization; i.e., they must be slowed down to the thermal neutron energy level; before they can be effectively captured or absorbed. The materials or elements suitable for the slowing down of fast neutrons are those with a low atomic number. The materials which can advantageously be used for the absorption of thermal neutrons are those with a high effective neutron capture cross-section such as, for example, boron.

As is known to those skilled in the art, and as will be obvious from the above brief discussion, efficient protection against nuclear radiation can be provided only through utilization of a material which slows down and absorbs neutrons and which reduces the intensity of gamma rays. However, because of the different characteristics of neutrons and gamma rays, no single material can provide effective shielding with respect to both types of radiation. Restated, in order to effectively shield a source emitting both neutrons and gamma rays, a material consisting of at least two different materials must be used; one material serving for the deceleration and/or absorption of the neutrons and the other for reducing the intensity of the gamma rays.

One material which is known to satisfactorily fulfill the above discussed shielding requirements consists of a lead powder mixed in a synthetic binder such as a polyester or epoxy resin. While the lead containing synthetic resin materials have provided a solution for the problem of affording protection against nuclear radiation, and particularly against neutrons and gamma rays, these resinous materials suffer the drawbacks of comparatively high expense and comparative instability when exposed to nuclear radiation and to heat. Accordingly, shielding materials consisting of lead and a synthetic resin binder clearly are not an ideal choice for most applications.

Considerable research directed to the development of a binder with which lead can be mixed, and which will have economic advantages when compared to the previously proposed synthetic resins, has been conducted. For most applications the most attractive material for use as such an economical binder is hydraulic cement. Thus, over the years attempts have been made to perfect a lead-loaded concrete. Previously proposed lead concretes have, however, proven to be less than satisfactory. As mentioned above, to insure effective attenuation of gamma rays, a material of very high density is required. In the types of lead concrete hitherto foreknown, the lead has been incorporated in the concrete in a pulverous state and the resulting material has had a maximum density of 6.5. This density is insufficient to insure effective protection against gamma radiation. A further deficiency of previously proposed lead concretes resides in the fact that chemical reactions occur between the concrete and the lead. More precisely, when brought into contact with the moisture and water contained in the cement, the lead will oxidize and expand and this expansion will result in fissuring and disintegration of the concrete.

SUMMARY OF THE INVENTION

The present invention overcomes the above briefly discussed and other deficiencies and disadvantages of the prior art by providing a novel and improved lead-loaded concrete characterized by high density and excellent mechanical properties. The lead-loaded concrete of the present invention insures effective protection against nuclear radiation, particularly gamma rays and neutrons, and may be employed for a variety of purposes.

The present invention also contemplates a novel lead alloy for use in a high-density lead-loaded concrete and a method of production of such alloy and concrete. The novel lead alloy of the present invention is characterized by a composition wherein the constituents, in percent by weight, are within the following limits:
tin: 1.3—1.9%
antimony: 1.3—1.9%
lead: remainder In accordance with the preferred embodiment of the invention, the above described novel lead alloy is mixed with hydraulic cement in the form of powder and grains. Thus, in accordance with one embodiment, the hydraulic cement in accordance with the invention comprises, per cubic meter of concrete, the following materials by weight:

| MATERIAL | WEIGHT | % BY WEIGHT |
|---|---|---|
| hydraulic cement: | 420–480 kg | 4.5–9% |
| lead alloy powder: | 1800–2500 kg | 20–44% |
| "large" size lead alloy grains: | 2000–4000 kg | 22–70% |
| "medium" size lead alloy grains: | 1300–1800 kg | 15–32% |
| water: | 120–180 liters | 1.3–3% |

A lead-loaded concrete in accordance with the invention may also include a material having high neutron capture cross-section, for example a boron containing compound such as calcium borate, for the purpose of thermalizing and capturing neutrons.

DESCRIPTION OF THE PREFERRED EMBODIMENTS

As previously noted, the present invention encompasses a stable lead-loaded concrete in which the lead does not oxidize or cause any fissuring of the concrete. This result is achieved by selection of a type of commercial cement, for example a refractory cement including alumina, in which the reaction between the cement and the lead will be at a minimum and by the mixing with this cement of lead in the form of an alloy having the maximum stability when exposed to moisture in the hydrous cement. The lead alloy of the present invention, which does not oxidize when in contact with the moisture of the concrete, contains by weight 1.3–1.9% tin, 1.3–1.9% antimony with the remainder being lead. A particularly advantageous alloy in accordance with the invention is characterized by the following weight ratios:
  tin: —1.5%
  antimony: —1.5%
  lead: —97%

Also in accordance with the present invention, the density of a lead including concrete is increased by using the above described lead alloy in plural forms and particularly in both pulverized and granular states. Tests have shown that a lead concrete having a density of between 8.20 and 8.55, which insures effective protection against gamma radiation, may be achieved by judicious selection of the particular grain size of the lead alloy. Thus, a lead alloy concrete with a wet density of 8.44 will result from employment, per cubic meter, of the following formulation:
  refractory cement with 40% alumina: —450 kg
  lead alloy powder: —2400 kg
  "large" size grains of lead alloy: —3920 kg
  "medium" size grains of lead alloy: —1520 kg
  water: —150 liters The lead alloy power will be comprised of particles preferably having an elongated shape in the interest of increasing the specific surface area of the particles and enabling the particles to adhere more firmly to the cement. Thus, to the extent possible, the spherical shape should be avoided for the powder particles. As previously noted, the chemical composition of the alloy from which the powder is formed must be selected with particular care since, owing to the considerable specific surface area, the lead alloy powder particles are the additives most liable to oxidize and expand thus causing the concrete to stretch and disintegrate. The powder particles have a "diameter" of less than 1 mm and preferably have a "diameter" in the range of 300 to 1000 microns.

The second classification of lead alloy additive, termed "medium" size grains or "shot", consists of particles having a diameter in the range of 1 to 4 mm and preferably between 1 and 3 mm. The use of the granulate "shot" insures a very high apparent density and makes it possible to produce a lead concrete which is very dense and easy to handle. The shape of the "medium" size grains or "shot" is approximately spherical.

The third lead alloy additive classification, referred to as "large" size or "scrap", consists of particles having a diameter in the range of 4 to 10 mm and preferably between 5 and 6 mm. In order to enable the "large" size lead alloy grains to adhere more firmly to the hydraulic cement binder the shape of the particles is not uniform but preferably has an undulating contour.

The proportion of water to be used must be selected with comparative accuracy since a slight excess of water impedes the vibration-compacting of the lead concrete of the present invention. The lead concrete of the present invention may be prepared by the same method as conventionally used in the preparation or ordinary concrete. However, in view of the very high density of the concrete of the invention, it is advisable to use a mixer of small capacity.

Protection against neutrons results from deceleration or thermalization of the fast neutrons and absorption or capture of thermal neutrons. In the concrete in accordance with the invention, fast neutrons will be thermalized or moderated as a result of the presence of hydrogen; i.e., a low atomic number material; in the water. Additionally, boron may be employed to enhance neutron capture. Thus, in accordance with a further embodiment, a borated compound is added to the lead alloy concrete for the purpose of absorbing neutrons. An example of a lead alloy granulate concrete in accordance with the invention and including a borated compound comprises, by weight per cubic meter, the following constituents:
  cement: —450 kg
  pandermite: —400 kg
  lead alloy powder; —2000 kg
  "medium" size grains of lead alloy: —1600 kg
  "large" size grains of lead alloy: —2450 kg
  water: —175 liters Pandermite is a mineral containing up to 48% calcium borate and about 18% water of crystallization. The above concrete, which has a boron content of approximately 0.7%, decelerates fast neutrons and absorbs thermal neutrons. While the wet density of the lead concrete including the borated compound is slightly lower than that of the above described lead concrete without the calcium borate, 7.0 vrs 8.44, it is nevertheless sufficiently dense to insure adequate attenuation of gamma rays.

A lead concrete in accordance with the present application is also highly suitable for use in the manufacture of reinforced concrete, whether prestressed or not. A reinforced lead alloy granulate concrete in accordance with the invention can thus advantageously be used in the construction of nuclear power stations wherein concrete structures, in addition to providing effective radiation shielding, are also exposed to considerable mechanical stresses. The physical and mechanical properties of reinforced concrete employing the lead alloy of the present invention are unaffected by the incorporation of a borated compound into the lead-loaded cement.

In accordance with the present invention, a reinforced concrete may comprise, by weight per cubic meter, the following constituents:

| MATERIAL | WEIGHT | % BY WEIGHT |
| --- | --- | --- |
| cement with 40% alumina: | 420–480 kg | 4–9% |
| lead alloy powder: | 1800–2500 kg | 20–44% |
| "large" size grains of lead alloy: | 2000–4000 kg | 22–70% |
| "medium" size grains of lead alloy: | 1300–1800 kg | 15–32% |
| pandermite: | 0–400 kg | 0–5.5% |

It will be understood that the lead alloy comprising the power and granules in the above reinforced concrete is characterized by the following composition in percents by weight:
  tin: —1.5%
  antimony: —1.5%
  lead: —97%

It is worthy of note that the cement used in the manufacture of lead alloy granulate concrete in accordance with the present invention is preferably a refractory cement containing 40% alumina. The use of this refractory cement with 40% alumina enables the lead concrete and reinforced lead concrete to withstand temperatures as high as 800° C. The significance of this ability to withstand high temperatures is particularly important and may be contrasted with the fact that lead normally loses its rigidity at temperatures in the range of 200° to 300° C. The temperature-resisting property of lead alloy concretes and reinforced lead alloy concretes in accordance with the present invention affords a means of preventing serious accidents caused by accidental overheating in nuclear power stations.

Continuing with a discussion of the mechanical properties of lead alloy granulate concretes in accordance with the present invention, it is noteworthy that these properties are the same as those of ordinary concrete thus permitting wide utilization of the invention. The present concrete may, for example, be cast in situ for the manufacture of enclosure walls or protective screens. The concrete of the present invention may also be produced in the form of prefabricated elements such as, for example, parallelopipedal bricks. In places where access is difficult, for example where a leak has to be repaired or some other form of nuclear accident remedied, the lead alloy granulate concrete may be manufactured in proximity to the desired point of application and then conveyed through flexible tubes to the application point. The lead concrete according to the present invention is particularly suitable for use in connection with nuclear reactors, either stationary as employed at power stations or propulsion reactors for marine vessels, for use in or as transport cakes for radioactive materials, for use in or as transport casks for radioactive wastes, for use in storage facilities for radioactive waste, for use in hospitals and other facilities where isotopes are employed and in the making of joints and gamma leakage blocking in concrete enclosures.

Nuclear radiation absorption and attenuation tests have been carried out with the borated lead alloy granulate concrete of the present invention and excellent results obtained. The following table illustrates the results obtained in measuring the attenuation of gamma rays emanating from a $^{60}Co$ point source of one Curie intensity. Protective screens of different thickness and comprised of ordinary concrete, borated lead alloy granulate concrete in accordance with the present invention and lead were positioned between this point source of gamma radiation and an ionization chamber. The table shows the discharge, expressed in mrad-h, measured at one meter from the point source, and also the attenuation (Do/D) of the radiation in relation to the measurement ($Do/D_{air}$) effected in air.

| Thickness of screen | Ordinary concrete | | Borated lead concrete | | Lead | |
| --- | --- | --- | --- | --- | --- | --- |
| | mrad/h | attenuation | mrad/h | attenuation | mrad/h | attenuation |
| 5 cm | 780 | 1.6 | 330 | 3.8 | 110 | 12.5 |
| 10 cm | 560 | 2.2 | 75 | 16.5 | 6.6 | 190 |
| 15 cm | 350 | 3.6 | 11.5 | 110 | 0.35 | 3600 |

The above table confirms the excellent gamma ray attenuation performance of the borated lead concrete according to the present invention in comparison with ordinary concrete. The attenuation of the gamma rays by pure lead is, of course, considerably greater than produced by the borated lead concrete of the invention but lead cannot generally be used by itself since, the obvious economic obstacles aside, lead does not afford shielding from neutrons.

Neutron moderation tests have also been made employing a Pu-Be point source of $1.9 \times 10^6 n.cm^2.s^{-1}$ providing neutrons with an average energy of 4 MeV. The tests were performed with a detector which supplied results in terms of impulses per minute with screens of different thickness installed between the neutron source and the detector. The following table contains the results of the measurements carried out for screens of ordinary concrete, borated lead alloy granulate concrete in accordance with the present invention and polyethylene bricks including powdered lead. The counts per minute recorded without any screen separating the source and detector was 274 impulses per minute.

| Thickness of screen | Ordinary concrete | Lead concrete | Polyethylene |
| --- | --- | --- | --- |
| 5 cm | 264 imp./min. | 223 imp./min. | — |
| 10 cm | 223 imp./min. | 204 imp./min. | 129 imp./min. |
| 15 cm | 167 imp./min. | 136 imp./min. | — |

The excellent protection afforded against neutrons by the borated lead concrete of the present invention, in comparison to ordinary concrete, is readily apparent from the above table. While the performance of the polyethylene bricks is superior to that of the borated lead concrete, it must be borne in mind that such polyethylene bricks are ineffective in the shielding of gamma radiation and, accordingly, even if polyethylene bricks could economically be employed the lack of gamma ray attenuation precludes the use of this type of material.

While preferred embodiments have been shown and described, various modifications and substitutions may be made without departing from the spirit and scope of the invention. Accordingly, it will be understood that the present invention has been described by way of illustration and not limitation.

What is claimed is:
1. A lead alloy granulate concrete including, in percent by weight, the following constituents:
  4.5–9% hydraulic cement;

20-44% lead alloy powder including 1.3-1.9% tin, 1.3-1.9% antimony and 96.2-97.4% lead;

22-70% lead alloy particles having average diameter in the range of 4 to 6 mm, said particles comprising 1.3-1.9% tin, 1.3-1.9% antimony and 96.2-97.4% lead;

15-32% lead alloy particles having an average diameter in the range of 1 to 4 mm, said particles comprising 1.3-1.9% tin, 1.3-1.9% antimony and 96.2-97.4% lead; and 1.3 to 3% water.

2. The concrete of claim 1 wherein the wet density lies within the range of 8.2 to 8.55.

3. The concrete of claim 1 further comprising:
0 to 7% of a boron containing composition.

4. The concrete of claim 1 wherein the cement comprises a refractory cement including alumina.

5. The concrete of claim 3 wherein the cement comprises a refractory cement including alumina.

6. The cement of claim 5 wherein the boron containing compound comprises calcium borate.

7. The concrete of claim 6 wherein the wet density lies within the range of 8.2 to 8.55.

8. The concrete of claim 1 wherein the constituents, in percent by weight, include the following:
5.2% hydraulic cement;
28% lead alloy powder comprised of 1.3-1.9% tin, 1.3-1.9% antimony and 96.2-97.4% lead;
47% lead alloy particles having an average diameter in the range of 4 to 6 mm, said particles comprising by weight 1.3-1.9% tin, 1.3-1.9% antimony and 96.2-97.4% lead;
18% lead alloy particles having an average diameter in the range of 1 to 4 mm, said particles comprising 1.3-1.9% tin, 1.3-1.9% antimony and 96.2-97.4% lead; and
1.8% water.

9. The lead alloy granulate concrete of claim 1 wherein the constituents, in percent by weight, include:
6% hydraulic cement;
5.5% pandermite;
28% lead alloy powder, said powder comprising, by weight, 1.3-1.9% tin, 1.3-1.9% antimony and 96.2-97.4% lead;
35% lead alloy particles having an average diameter in the range of 4 to 6 mm, said particles comprising, by weight, 1.3-1.9% tin, 1.3-1.9% antimony and 96.2-97.4% lead;
23% lead alloy particles having an average diameter in the range of 1 to 4 mm, said particles comprising, by weight, 1.3-1.9% tin, 1.3-1.9% antimony and 96.2-97.4% lead; and
2.5% water.

* * * * *